United States Patent [19]
Hild et al.

[11] Patent Number: 5,639,023
[45] Date of Patent: Jun. 17, 1997

[54] METHOD OF CONTROLLING THE WATER TEMPERATURE IN A BEVERAGE-BREWING APPARATUS

[75] Inventors: Holger Hild, Idstein; Dietwald Schotte, Eschborn, both of Germany

[73] Assignee: Braun Aktiengesellschaft, Germany

[21] Appl. No.: 516,608

[22] Filed: Aug. 18, 1995

[30] Foreign Application Priority Data

Sep. 30, 1994 [DE] Germany ............... 44 35 100.3

[51] Int. Cl.$^6$ ............... F23N 1/08; A47J 27/62
[52] U.S. Cl. ............ 236/20 A; 236/78 D; 126/374; 99/332
[58] Field of Search .............. 236/78 D, 20 R, 236/20 A; 219/494; 126/374; 99/332

[56] References Cited

U.S. PATENT DOCUMENTS

| | | | |
|---|---|---|---|
| 4,172,555 | 10/1979 | Levine | 236/46 R |
| 4,465,228 | 8/1984 | Mori et al. | 236/20 A |
| 5,090,305 | 2/1992 | Lehman | 126/374 |

FOREIGN PATENT DOCUMENTS

| | | |
|---|---|---|
| 0267649 | 5/1988 | European Pat. Off. . |
| 0380369 | 1/1990 | European Pat. Off. . |
| 2586522 | 2/1987 | France . |
| 3642181C1 | 12/1986 | Germany . |
| 2170326 | 7/1986 | United Kingdom ......... 236/20 A |
| 2191024 | 12/1987 | United Kingdom . |

Primary Examiner—William E. Wayner
Attorney, Agent, or Firm—Fish & Richardson P.C.

[57] ABSTRACT

The invention is directed to a method of controlling the water temperature in a beverage-brewing apparatus, wherein the water is initially heated in an open water reservoir up to the boiling point, said boiling point being reached in that the water is heated from the initial temperature $T_i$ up to a temperature $T_{HIGH}$ at which it is ensured that the water does not boil as yet under conventional environmental conditions, in that the rate of change of the temperature $dT/dt$ during heating from the initial temperature $T_i$ to the temperature $T_{HIGH}$ is determined, in that on reaching the temperature $T_{HIGH}$ a period of time $t_{heiz}$ is determined from the difference between 100° C. and $T_{HIGH}$ as well as from the rate of change of the temperature $dT/dt$, and in that on reaching the temperature $T_{HIGH}$ the water continues to be heated during the period of time $t_{heiz}$. The temperature $T_{HIGH}$ is 75° C., approximately.

10 Claims, 4 Drawing Sheets

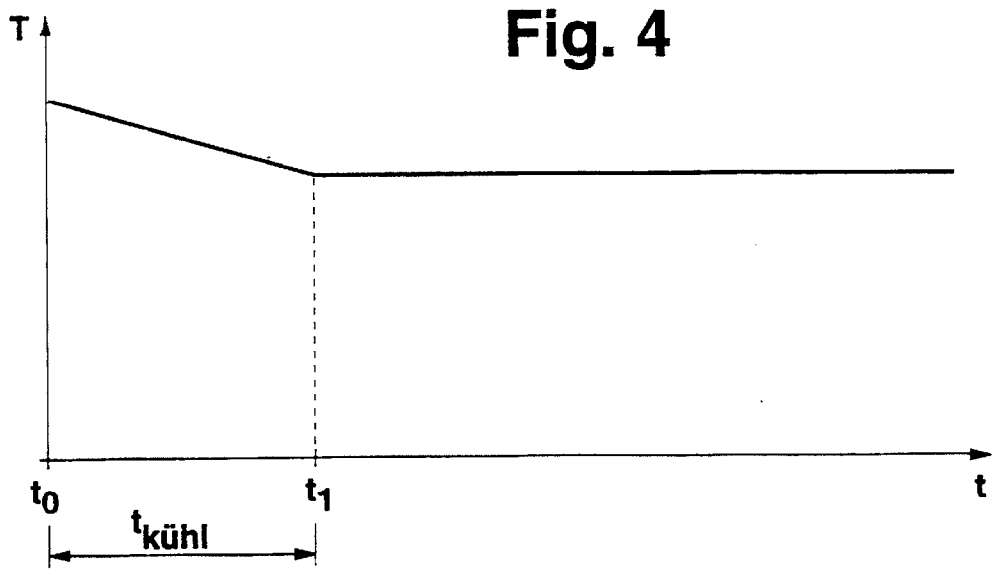
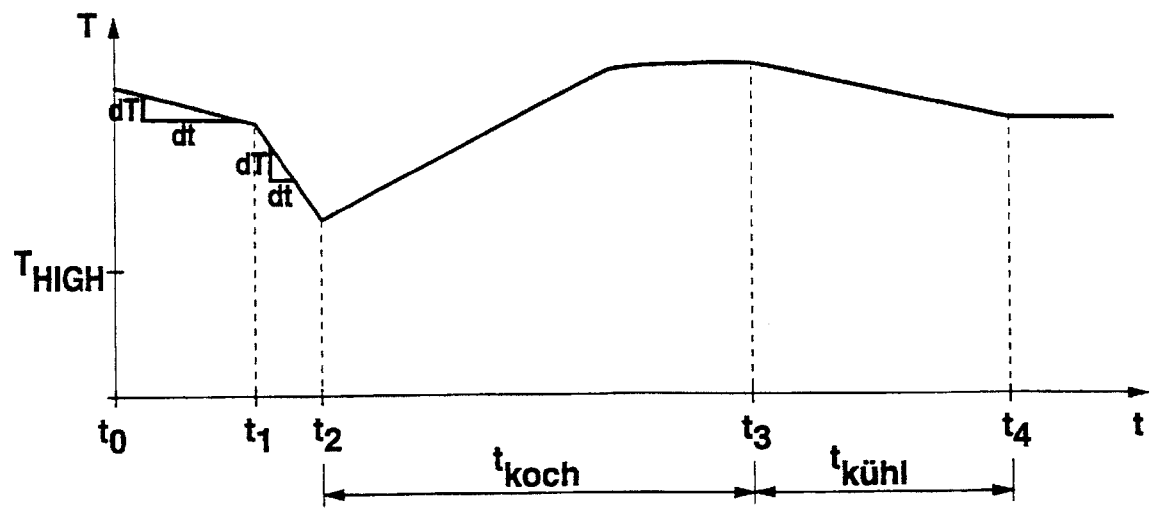

METHOD OF CONTROLLING THE WATER TEMPERATURE IN A BEVERAGE-BREWING APPARATUS

This invention relates to a method of controlling the water temperature in a beverage-brewing apparatus.

In conventional beverage-brewing apparatus customarily finding domestic application as, for example, coffee or espresso makers, the water is heated in that a pump feeds cold water from a water reservoir through a flow-through heater, the hot water subsequently flowing through the coffee or espresso grinds. In such apparatus, the temperature of the water depends on the period of time for which the water remains in the flow-through heater, to the effect that in the presence of a high flow rate and a resultant short period for which the water remains in the flow-through heater, a comparatively low water temperature is attained, while in the presence of a low flow rate and an attendant long dwell period of the water in the flow-through heater a comparatively high water temperature is achieved.

On the other hand, a beverage-brewing apparatus is further known in which the water is first heated in a so-called open water reservoir in which the water is at all times under atmospheric pressure, and is then forced through the coffee or espresso grinds by means of a pump.

In contrast to the first-mentioned embodiment, this second embodiment has the advantage of enabling the water to be initially controlled to a specified temperature before it is fed through the coffee grinds and in particular the espresso grinds. This has a beneficial effect particularly when it is desirable in the brewing of espresso that the two parameters decisive for the quality of espresso, that is, temperature and pressure, be set independently of each other. In the beverage-brewing apparatus of the first embodiment, an increase in pressure involves an increase in the delivery rate of the pump and thus at the same time a decrease in the water temperature. Accordingly, an independent control of these two parameters is not possible in the beverage-brewing apparatus of the first embodiment.

Further, a method is known (EP 0 380 369 A1) in which the rate of change of the temperature is sensed as the water is heated. The boil condition is detected if the rate of change of the temperature decreases or becomes "0". When the boiling point is reached, although power continues to be supplied, further heating of the water is not effected because at this temperature the water changes state from a liquid to a vapor, and the energy supplied is required to deliver to the water the latent heat necessary for the change of state. In this method, it is thus derived from the rate of change of the temperature when the boiling point of the water is reached, by comparing the rate of change of the temperature against a threshold value, the boil condition being detected when the value drops below this threshold value which is of the order of magnitude of "0".

By contrast, the method of the present invention operates in a different manner. Advantageously, the temperature $T_{HIGH}$ may be of an order of magnitude of between 75° C. and 80° C. By evaluating the rate of temperature increase until this particular temperature $T_{HIGH}$ is reached, it is possible to use a temperature sensor that is required to meet lower demands with respect to measurement accuracy than is the case in the prior art. Another advantage is obtained in that the method of the present invention enables a slower-acting sensor system to be used. This thus eliminates the need for the temperature sensor to be in direct contact with the water in order to obtain as rapidly as possible a corresponding sensor signal precisely at the instant the water reaches the boiling point. As the water is heated up to temperature $T_{HIGH}$, it can be observed that the temperature of the water rises relatively significantly with time. In evaluating this relatively significant rate of temperature rise, an absolute measurement error of the temperature sensor will effect a lower relative measurement error than is the case in the prior art where temperature increases of the order of magnitude of "0" have to be evaluated. There, absolute errors of the temperature sensor play a substantially greater role in the individual measurements. From the instant the temperature $T_{HIGH}$ is reached, the further heating cycle of the water proceeds only under time control, so that an evaluation of the low rates of temperature rise is no longer necessary when the boiling point is reached. By taking into account the rate of change of the temperature, the amount of water held in the water reservoir is considered as the heating cycle proceeds further. If the water reservoir contains only a relatively small amount of water, this means that a relatively significant rate of change of the temperature was to be observed until the temperature $T_{HIGH}$ is reached, requiring a comparatively shorter period of time until the boiling point is reached. When the reservoir holds a larger amount of water, this means that the rate of change of the temperature is relatively low, and that more time is needed to heat this larger amount of water up to boiling. In addition, the difference in temperature between the order of magnitude of 100° C. and $T_{HIGH}$ plays a role for the period of time for which heating of the water has to be continued after the temperature $T_{HIGH}$ is reached. When the period of time is directly determined from this temperature difference between 100° C. and $T_{HIGH}$, the period of time during which heating continues is sufficient to heat the water to the temperature of 100° C. at an atmospheric pressure of 1 bar. However, if due to a lower atmospheric pressure the boiling point lies below 100° C., the period of time $t_{heiz}$ may, under circumstances, be too long. Yet, the water nevertheless reaches the boiling point reliably. Heating is, under circumstances, only continued for some time after the boiling point is reached.

In the method of the present invention it proves an advantage over the prior art that the method is relatively insensitive to cold water being added. When cold water is added in the method of the prior art, it may happen, due to the mixture ratio of the heated water to the cold water added thereto, that a temperature rise of the order of magnitude of "0" occurs for a short period. If the rate of change of the temperature is derived at this particular instant and a rise of the order of magnitude of "0" is detected in the process, it is concluded in the method of the prior art that the water has reached the boiling point. The prior-art method thus detects a boil condition when cold water is added although in actual fact the water has not yet reached the boiling point.

By deriving the period of time for which heating continues after the temperature $T_{HIGH}$ is reached from the rate of change of the temperature prior to reaching the temperature $T_{HIGH}$, it is therefore possible in an advantageous manner for the water to reach the boiling point reliably as opposed to the method of the prior art. According to another aspect of the invention, an additional discrimination can be made as to whether the temperature $T_i$ which the water has before the heating cycle starts is above or below a temperature $T_{LOW}$ which is of an order of magnitude of 60° C. Obviously, if prior to the beginning of the heating cycle the temperature $T_i$ of the water is higher than this temperature $T_{LOW}$, but still lower than the temperature $T_{HIGH}$, it may happen that in an evaluation of the rate of change of the temperature until the temperature $T_{HIGH}$ is reached, the effect of possible errors due to the sensor used is too severe. In order to enable the boiling point to be reached reliably in this case, in the event of the temperature $T_i$ lying between the temperature $T_{LOW}$ and the temperature $T_{HIGH}$ the method provides for continued heating for a specified period of time after the temperature $T_{HIGH}$ is reached, which period is independent of the rate of change of the temperature until the temperature $T_{HIGH}$ is reached. This specified time period $t_{koch}$ is determined from the parameters 100° C. and $T_{HIGH}$, such that in a reservoir filled to capacity the water can be heated to the boiling point of 100° C. during this specified time period.

In embodiments of the method, the period of time $t_{heiz}$ during which heating continues after the temperature $T_{HIGH}$ is reached is determined in direct dependence on the temperature difference between $T_{HIGH}$ and 100° C., as well as inversely proportional to the rate of change of the temperature. Advantageously, this makes allowance for the fact that in the supply of a constant quantity of heat per unit of time, the time period during which this heat quantity is required to be supplied is proportional to the differential temperature by which a temperature increase is required to take effect, as well as proportional to the thermal capacity of the material to be heated by this differential temperature. The thermal capacity, that is, ultimately the amount of water, can be determined from the rate of change of the temperature until the temperature $T_{HIGH}$ is reached.

Errors possibly occurring in the determination of the individual values of the rate of change of the temperature can be eliminated by averaging.

It is possible to determine in an advantageous manner whether or not cold water has been added. It will be noted that a minimum value of the rate of change of the temperature results that corresponds to the value of the temperature variation with the water reservoir filled to capacity. With the water reservoir full, the temperature rises at a comparatively slow rate. Using this slow rise in the embodiment of the method of claim 5 as the predetermined minimum value, it can be derived from the occurrence of a variation of temperature with time below this minimum value that obviously cold water has been added. Advantageously, these values of the rate of change of the temperature are then not considered in the determination of the time period during which heating is to be continued.

It is particularly advantageous that the time period during which heating is to be continued is related to the quantity of water effectively held in the water reservoir. If it is determined that cold water has been added, the water reservoir logically holds a greater amount of water subsequent to such replenishment. Advantageously, therefore, the period of time $t_{heiz}$ during which heating is to be continued must be related to this greater amount of water present on replenishment. In embodiments of the method, this is accomplished in that only those values of the rate of change of the temperature are considered that are determined following replenishment.

A water temperature is advantageously reached which, in accordance with the specified time, corresponds to a value below the boiling point.

It is advantageously considered whether cold water is added to the water reservoir during the cooling cycle. It will be noted that with the heating device switched off and the water cooling down, a maximum heat transfer occurs, leading to a lower limit value of the rate of change of the temperature. Accordingly, when the temperature drops below this limit value of the rate of change of the temperature, this is due to the fact that cold water was added to the water reservoir. To avoid that water of insufficient temperature is then used for brewing the beverage, after replenishment is detected, the water continues to be heated for a period of time $t_{koch}$, subsequently cooling down again due to deactivation of the heating device, again for a set time period.

An excessive temperature drop is avoided in that the water temperature is controlled such as to be maintained constant at the value ensuing after the set time period, that is, the cooling cycle, has elapsed.

An embodiment of the present invention is illustrated in the accompanying drawings.

In the drawings,

FIGS. 1 to 5 are graphical representations of the water temperature plotted against time;

Figure 6:
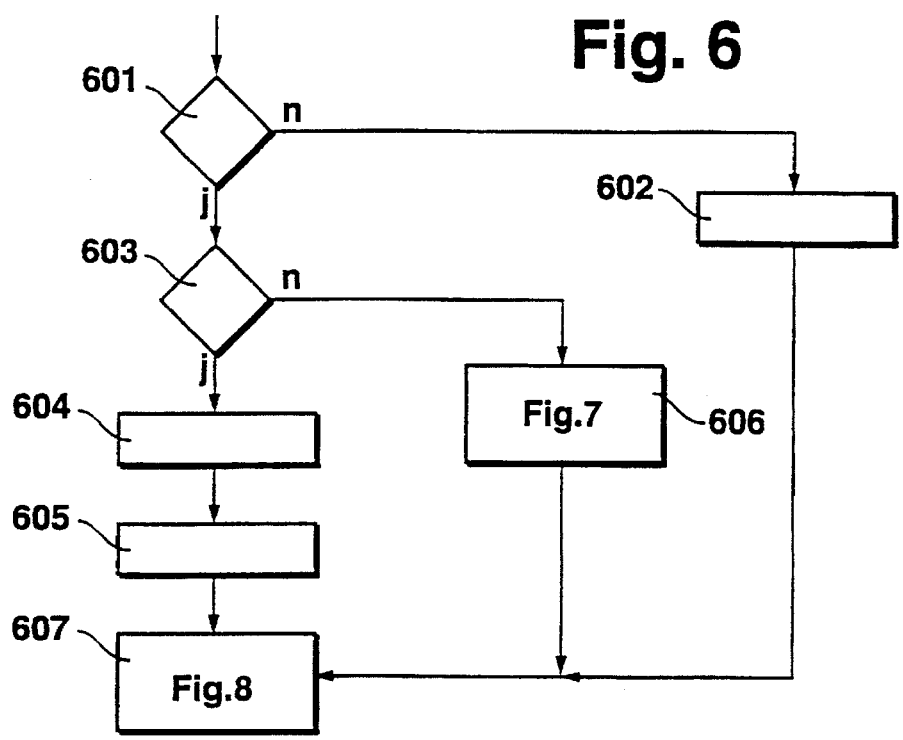
FIG. 6 is a flowchart illustrating the sequence of operations of the method of the present invention.

FIG. 6 shows a flowchart of the method of the present invention. First, a check is made in stage 601 to see whether the water temperature $T_i$ is lower than a temperature $T_{HIGH}$ prior to the beginning of the heating cycle. The temperature $T_{HIGH}$ is advantageously of an order of magnitude of between 75° C. and 80° C. This temperature value is selected because at this temperature it is ensured that the water does not boil as yet, not even under extreme atmospheric pressure conditions. If this condition is not satisfied, meaning that at the beginning of the heating cycle the water temperature $T_i$ is greater than or equal to the temperature $T_{HIGH}$, the routine proceeds to stage 602. In stage 602 the water is heated for a period of time $t_{koch}$. This period of time $t_{koch}$ is dimensioned such that with a water reservoir 10 filled to capacity and the heating device 12 turned on (see FIG. 9), the water heats during this time period $t_{koch}$ from temperature $T_{HIGH}$ to 100° C., provided of course that the boiling point of the water is at 100° C. If the boiling point of the water is lower than 100° C. as a result of environmental conditions, this means that the boiling point is reached by heating during the period of time $t_{koch}$, with the water continuing to be heated for some time after it has reached the boiling point. The important thing, however, is that the water does reach the boiling point. Upon heating the water during this period of time $t_{koch}$, the routine goes to stage 607 illustrated fully in FIG. 8 and described further below.

If the answer to the question asked in stage 601 is "yes", meaning that the water temperature $T_i$ prior to the beginning of the heating cycle is lower than the temperature $T_{HIGH}$, the routine proceeds to stage 603. In this stage 603 a check is made to see whether the water temperature $T_i$ prior to the beginning of the heating cycle is higher than a temperature $T_{LOW}$. This temperature $T_{LOW}$ is of an order of magnitude of 60° C. If this is not so, the routine proceeds to stage 606. In this event, this means that the temperature $T_i$ is lower than the temperature $T_{LOW}$. The succession of operations performed in stage 606 is illustrated fully in FIG. 7 and will be described in more detail further below.

If the check made in stage 603 produces the answer "yes", meaning that the temperature $T_i$ lies between the values $T_{LOW}$ and $T_{HIGH}$, the water is initially heated to temperature $T_{HIGH}$ in stage 604. Subsequently, heating of the water is continued for the period of time $t_{koch}$ which is identical with the period of time $t_{koch}$ in stage 602. This succession of operations performed in stages 604 and 605 may be suitable in cases where a determination of the rate of change of the temperature is difficult because the water temperature at the beginning of the heating cycle is too close already to the temperature $T_{HIGH}$, as a result of which the rate of change of the temperature can be determined only inaccurately. If the time period during which heating of the water is to be continued upon reaching the temperature $T_{HIGH}$, is to be determined from this only inaccurately determined rate of rise, errors in determining the time period may occur. In a modification of the method it is, of course, possible to derive the period of time $t_{heiz}$ at all events from the rate of change of the temperature, provided only that the temperature $T_i$ is lower than the temperature $T_{HIGH}$.

Figure 7:
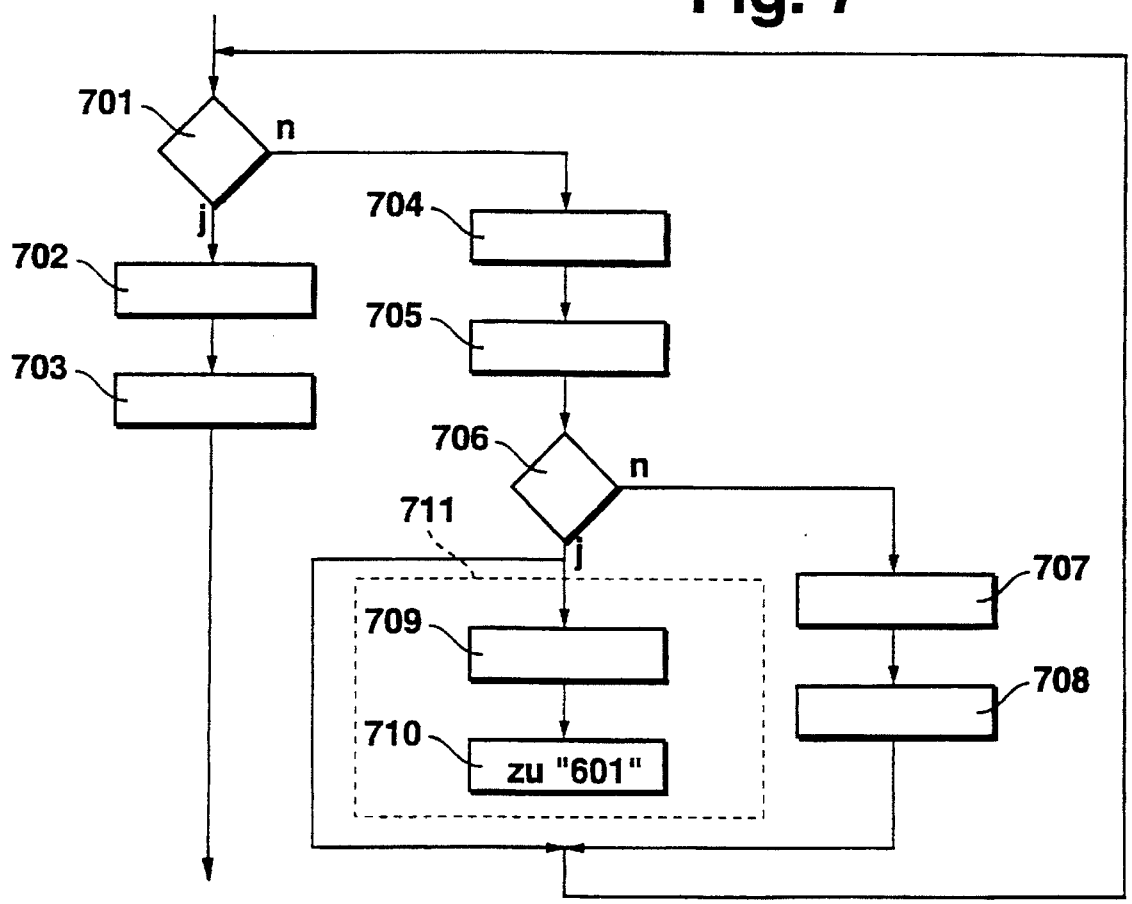
FIGS. 7 and 8 are flowcharts illustrating portions of the method to be inserted at the appropriate points in FIG. 6.

Stage 606 of FIG. 6 will be described fully with reference to FIG. 7. First a check is made in stage 701 to see whether, during heating, the water has reached the temperature $T_{HIGH}$. If this is the case, the routine proceeds to stage 702 in which the water continues to be heated during the period of time $t_{heiz}$. This period of time $t_{heiz}$ results from the computed values of the rate of change of the temperature. $t_{heiz}$ may be computed, for example, by dividing the difference between the temperatures 100° C. and $T_{HIGH}$ by the established value of the rate of change of the temperature dT/dt, or by the quantity termed "average value". After heating of the water has continued for the period of time $t_{heiz}$, a reset of variables used in the process sequence is performed in stage 703. These variables are referred to by "measuring points" and "average value" to be explained later with reference to FIG. 7. According to the flowchart of FIG. 6, stage 703 is followed by stage 607 to be explained further below with reference to FIG. 8.

If it is established in stage 701 that the water has not yet reached the temperature $T_{HIGH}$, the routine proceeds to stage 704 in which the water continues to be heated. In stage 705, the rate of change of the water temperature dT/dt is determined. This may be accomplished, for example, in that the temperature values present at two different instants of time are subtracted and divided by the time period that has elapsed between these two instants of time. As long as the water is heated, a minimum value of the rate of change of the temperature results, which occurs if the water reservoir is filled to capacity. However, if the rate of change of the temperature is below this minimum value, it can be concluded that an error condition has occurred as by replenishing the water reservoir with cold water. In order to avoid that these values of the rate of change of the temperature adulterate the rate of change of the temperature, the simplest solution is to ignore these values of rate of change of temperature. On the other hand, there is a predeterminable maximum value $m_{max}$ of the rate of change of temperature which is reached if the heating cycle is performed with the water reservoir nearly empty. If this predeterminable maximum value of the rate of change of the temperature is exceeded, it can be derived therefrom that hot water was added to the water reservoir during the heating cycle. A check is therefore made in stage 706 to see whether the rate of change of the temperature is smaller than this predetermined minimum value $m_{min}$ which results if a full water reservoir is heated, or whether the rate of change of the temperature is greater than the predeterminable maximum value $m_{max}$. If the result of this check in stage 706 is "yes", these values of the rate of change of the temperature may be ignored in accordance with the arrow 711. Advantageously, however, the routine proceeds to stage 709. This is because the amount of water has logically increased on replenishment, causing also the rate of change of the temperature to differ from the rate prevailing before water was added. Accordingly, since in the event of several measuring points being used the values so far determined have related to an amount of water that is no longer true, it is advantageous to delete the values so far determined, neglecting them. Therefore, in stage 709 the corresponding variables termed "average value" and "measuring points" are set to "0", and according to stage 710 the routine goes to stage 601, meaning that the process for reaching the boiling point is restarted.

If the check made in stage 706 determines that the value of the rate of change of the temperature is greater than or equal to this minimum value of the rate of change of the temperature and at the same time smaller than the predeterminable maximum value, the average value of the rate of change of the temperature is re-computed in stages 707 and 708. This is accomplished in that a variable termed "measuring points" is incremented in stage 707. In stage 708 the average value is then re-computed by including this one value of the rate of change of the temperature that has effectively ensued in the computation of the average value, with an appropriate weighting being performed. This may be accomplished by multiplying the average value so far determined by the variable "measuring points" decremented by 1, by subsequently adding the effectively determined rate of change of the temperature, and by dividing this sum by the variable "measuring points". Equally, other ways of averaging may be provided. Thus, for example, it is possible to store individual values of the rate of change of the temperature in memory. The averaging process will be executed when the temperature $T_{HIGH}$ is reached. Because memory space is limited, it is however necessary to restrict the values of the rate of change of the temperature to be referred to for averaging to a set time period prior to the attainment of the temperature $T_{HIGH}$. According to the representation of FIG. 7, the routine then proceeds to stage 701, restarting the process of FIG. 7 in accordance with the above description.

Alternatively, if the check made in stage 706 has produced the answer "yes", it is also possible to continue heating of the water until the temperature $T_{HIGH}$ is reached, and to continue heating for the period of time $t_{koch}$ after the temperature $T_{HIGH}$ is reached. This is of particular advantage if a rate of change of the temperature is detected that is greater than the predeterminable maximum value.

Figure 8:
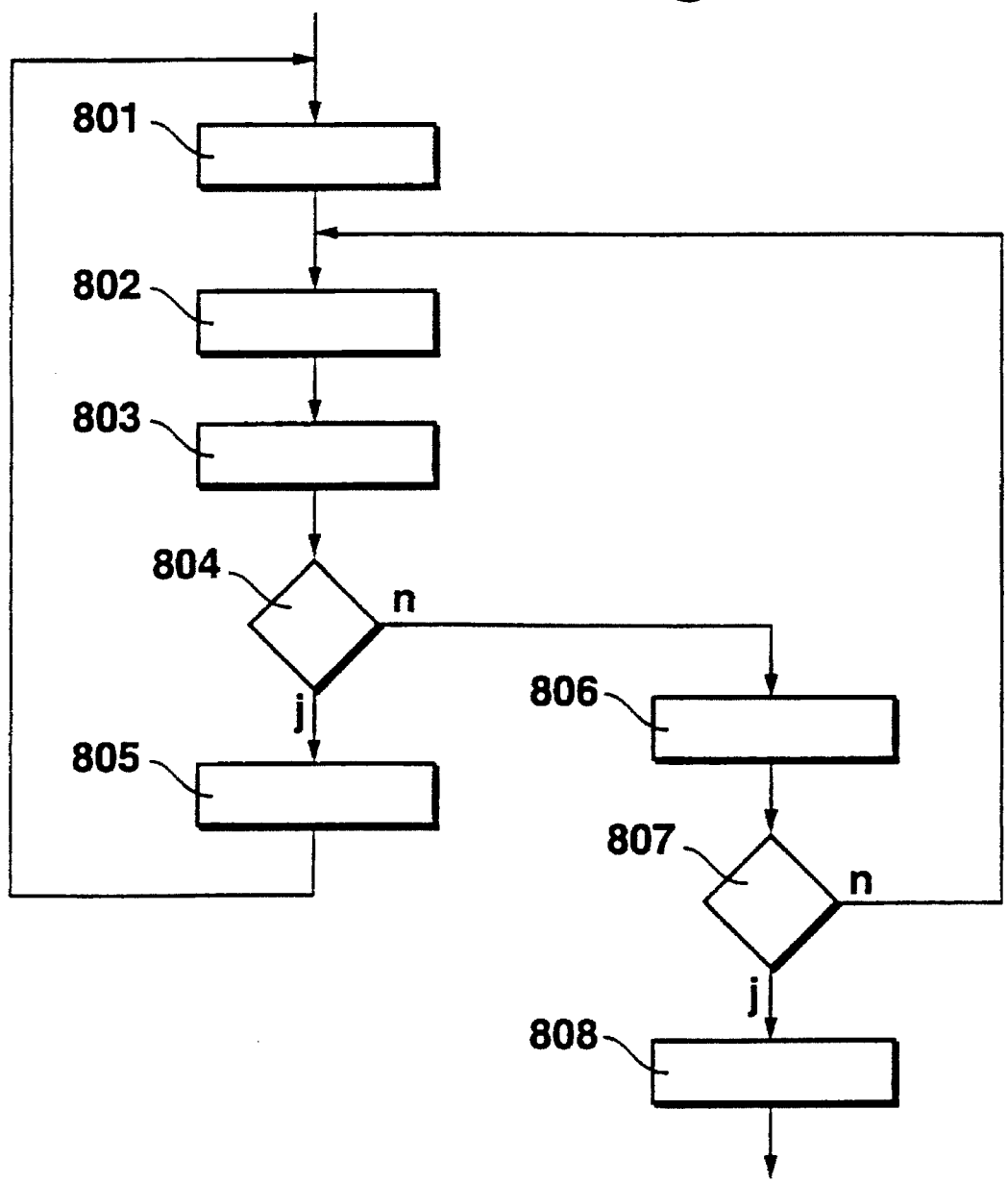
Figure 9:
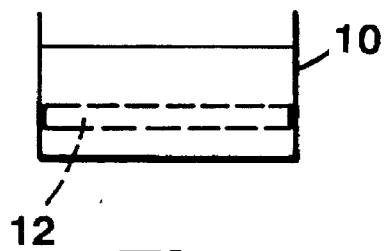
FIG. 9 is a diagrammatic illustration of a water reservoir.

FIG. 8 shows stage 607 of FIG. 6. At this stage, the water has reached the boiling point, causing the variable TIMER to be reset in stage 801. This variable serves the function of monitoring the cooling cycle after the water has reached the boiling point. Stage 801 is followed by stage 802 in which the water is cooled down. This occurs by leaving the water reservoir as is, with the heating device turned off. During this cooling cycle, stage 803 determines the rate of change of the temperature. There is a value of the rate of rise $m_{grenz}$ which ensues in the cooling cycle as a minimum rate of change of the temperature. This value results with the water reservoir empty. Accordingly, when a rate of change of the temperature occurs which is below this value $m_{grenz}$, it can be concluded that cold water was added during the cooling cycle. This is the case if the check in stage 804 produces the answer "yes", meaning that the rate of change of the temperature is lower than the value of the rate of rise $m_{grenz}$. In this event, stage 805 initiates a new heating cycle for a period of time $t_{koch}$, provided that the water temperature is higher than $T_{HIGH}$. If this is not so, the water is first heated to temperature $T_{HIGH}$ in stage 805, heating then continuing for the period of time $t_{koch}$. Subsequent to stage 805, the routine returns to stage 801. If it results from the check in stage 804 that the rate of change of the temperature is greater than or equal to the value of the rate of rise $m_{grenz}$, the routine proceeds to stage 806. In this stage, the variable TIMER is incremented. In the next sequential stage 807, a check is made to see whether the variable TIMER has reached the predetermined time period $t_{kuhl}$. If it has not, the routine returns to stage 802. If the variable TIMER has reached the value of the time period $t_{kuhl}$, the routine goes to stage 808 in which the water temperature is controlled so as to be maintained constant at the value that has ensued at this particular instant.

Figure 1:
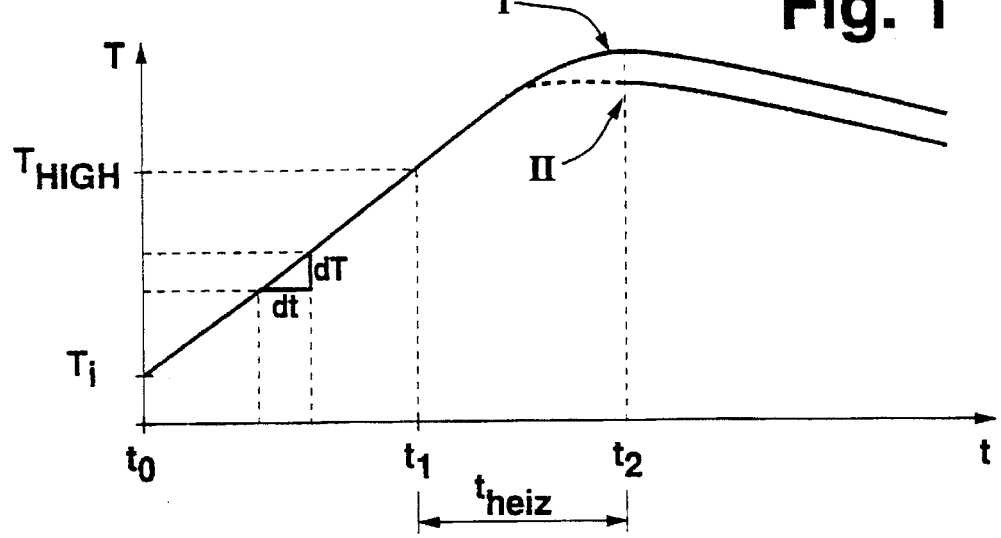

FIGS. 1 to 5 illustrate various rates of change of the temperature to be explained in the following. FIG. 1 shows that the water is heated starting from a temperature $T_i$ which is lower than the temperature $T_{HIGH}$. According to the triangle dT/dt shown, the rate of change of the temperature is determined by subtracting the temperature values detected at the respective instants of time and by dividing the difference by the time that has elapsed between the two instants of time. At the instant of time $t_1$, the water has reached the temperature $T_{HIGH}$. From the established rate of rise dT/dt, the period of time $t_{heiz}$ is then determined during which the water continues to be heated after the temperature $T_{HIGH}$ is reached. As can be seen, in dependence on the boiling point a curve pattern may result as shown in trace I or, alternatively, trace II. Trace I applies if the boiling point of the water is at 100° C., meaning that the water reaches its boiling point during the period of time $t_{heiz}$, the period of time $t_{heiz}$ having been determined by means of the rate of rise dT/dt. If the boiling point is below 100° C. as shown in trace II, the water reaches this particular boiling point as already before the time period $t_{heiz}$ has elapsed, continuing to boil for part of this period.

Figure 2:
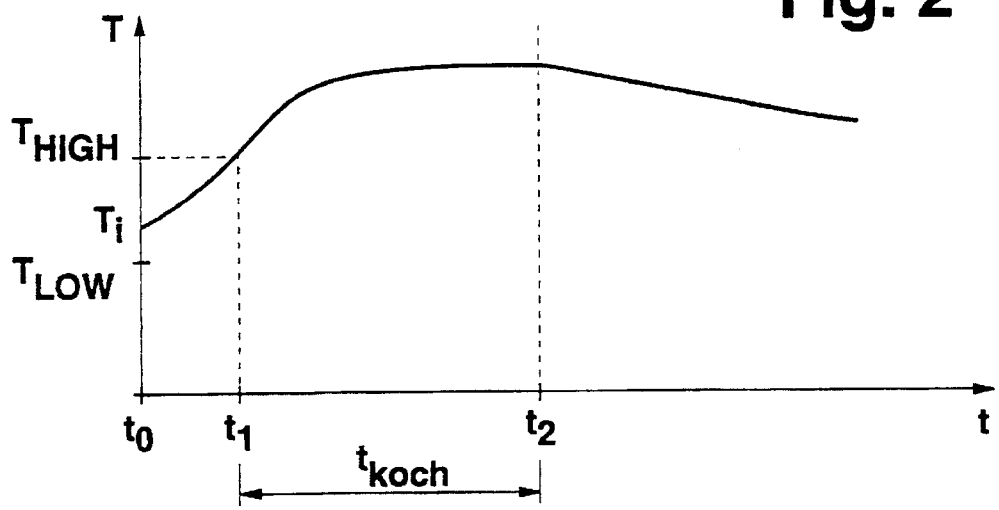

According to the representation of FIG. 2, water is heated starting from a temperature $T_i$ that lies between the temperatures $T_{LOW}$ and $T_{HIGH}$. Therefore, when the temperature $T_{HIGH}$ is reached at the instant of time $t_1$, the water continues to be heated for a period of time $t_{koch}$. This time period $t_{koch}$ is tailored to a water reservoir filled to capacity, so that in an only partly filled water reservoir, as in the showing of FIG. 2, the boiling point is reached as early as during the time period $t_{koch}$.

Figure 3:
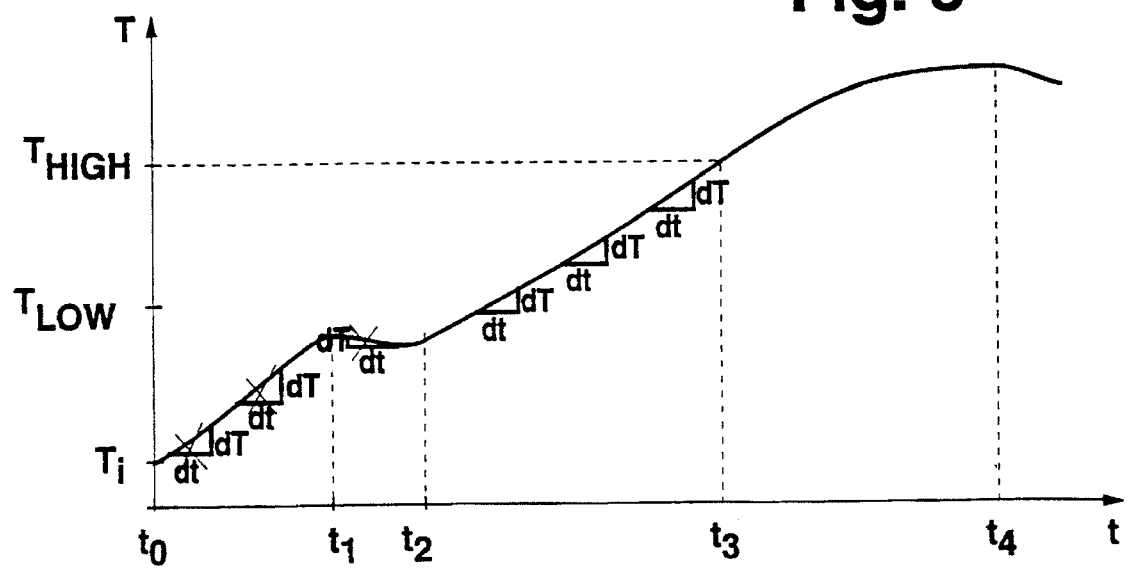

In FIG. 3, the temperature pattern ensuing as a function of time shows that the water is heated starting from a temperature $T_i$ that is lower than the temperature $T_{LOW}$. In the time period between $t_0$ and $t_1$, values of the rate of change of temperature are already determined and considered in an averaging process. At the instant of time $t_1$, cold water is added, which is derived from the fact that the rate of change of the temperature dT/dt is lower than the value $m_{min}$. In the example of FIG. 3, this value dT/dt is even negative. At the instant of time $t_2$, the temperature resumes its rise, and it can be seen that the temperature rise after the instant of time $t_2$ occurs more slowly than between the instants of time $t_0$ and $t_1$. This is due to the fact that a greater amount of water is held in the reservoir, resulting in a slower rate of temperature rise of the water as it is heated. In the period between the instants of time $t_2$ and $t_3$ when the temperature $T_{HIGH}$ is reached, further values of the rate of change of the temperature are determined. In the representation of FIG. 3 it shows that the values of the rate of change of the temperature until $t_2$ is reached are neglected, considering for the averaging process only those values of the rate of change of temperature that were determined in the period from $t_2$ until $t_3$. These values are then used for establishing the period of time $t_{heiz}$ during which the water continues to be heated from $t_3$ until $t_4$.

FIG. 4 shows that the water cools down for a period of time $t_{kuhl}$ after the periods $t_{heiz}$ and $t_{koch}$ have elapsed. Advantageously, this time period $t_{kuhl}$ is a predetermined constant value. When the cooling period $t_{kuhl}$ has elapsed at the instant of time $t_1$, a constant temperature results, that is, the water temperature is controlled such as to be maintained constant at the value that has ensued at the instant of time $t_1$ of FIG. 4 by switching the heating device on and off, as appropriate.

From the representation of FIG. 5 it becomes apparent that the water cools down upon reaching the boiling point. Between the instants of time $t_0$ and $t_1$, it shows that the rate of change of the temperature assumes a value corresponding to a normal cooling cycle. Obviously, cold water is added between the instants of time $t_1$ and $t_2$, meaning that the rate of change of the temperature becomes lower than a limit value $m_{grenz}$ of the rate of change of the temperature which is just sufficient to correspond to a normal cooling cycle with the water reservoir nearly or completely empty. This significant rate of change of the temperature in a negative sense, that is, the rapid rate of temperature decrease, is then due to the fact that cold water was added. The water is then heated for the period of time $t_{koch}$ from $t_2$ until $t_3$. Heating to temperature $T_{HIGH}$ is not applicable because the water temperature has not dropped below this temperature $T_{HIGH}$ even though cold water was added. In the period between the instants of time $t_3$ and $t_4$, the cooling cycle occurs again for the time period $t_{kuhl}$, and from the instant of time $t_4$ the water temperature is controlled such as to be maintained constant at the value that has occurred at this particular instant $t_4$.

The method may be implemented, for example, in that the signals of a temperature sensor are fed to a microprocessor (by means of an analog-to-digital converter). The microprocessor uses the signals it receives from the temperature sensor for further processing. Current values, for example, are stored in memory to the extent they are required for future evaluations. Further evaluations as the derivation of rise values (determination of the rate of rise) are sufficiently known for appropriately programming the microprocessor.

We claim:

1. A method of controlling the water temperature in a beverage-brewing apparatus, the water being initially heated in an open water reservoir up to the boiling point, said boiling point being reached by heating the water from an initial temperature $T_i$ up to a temperature $T_{HIGH}$ (701, 704) at which it is ensured that the water does not boil as yet under conventional environmental conditions, determining the rate of change of the temperature dT/dt during heating to the temperature $T_{HIGH}$ (705, 708), on reaching the temperature $T_{HIGH}$ determining a period of time $t_{heiz}$ from the difference between 100° C. and $T_{HIGH}$ as well as from the rate of change of the temperature dT/dt (702), and on reaching the temperature $T_{HIGH}$ continuing to heat the water during the period of time $t_{heiz}$ (702).

2. A method of controlling the water temperature in a beverage-brewing apparatus, the water being initially heated in an open water reservoir up to the boiling point, said boiling point being reached by heating the water starting from a temperature $T_i$, in the event of the temperature $T_i$ is higher than a temperature $T_{LOW}$ (603) the water is heated up to the temperature $T_{HIGH}$ if the water temperature $T_i$ is lower than the temperature $T_{HIGH}$ (604), heating subsequently continuing for a set period of time $t_{koch}$ (605), said period of time $t_{koch}$ being dimensioned such that during this set time period the water contained in a reservoir filled to capacity at an atmospheric pressure of 1 bar is heatable from the temperature $T_{HIGH}$ to the boiling point (100° C.), and in the event of the temperature $T_i$ is lower than the temperature $T_{LOW}$ the water is heated to the temperature $T_{HIGH}$ (701, 704), determining the rate of change of the temperature dT/dt during heating to the temperature $T_{HIGH}$ (705, 708), on reaching the temperature $T_{HIGH}$ determining a timer period $t_{heiz}$ from the difference between 100° C. and $T_{HIGH}$ as well as from the rate of change of the temperature dT/dt (702), and continuing to heat the water during the period of time $t_{heiz}$ on reaching the temperature $T_{HIGH}$ (702).

3. A method as claimed in claim 1 or claim 2, wherein the period of time $t_{heiz}$ is proportional to the difference between 100° C. and $T_{HIGH}$, as well as inversely proportional to the rate of change of the temperature dT/dt.

4. A method as claimed in any one of the claims 1 or claim 2, wherein the rate of change of the temperature dT/dt is averaged from several measuring points (707, 708) and values of the rate of change of the temperature dT/dt that are smaller than a predeterminable minimum value $m_{min}$ or greater than a predetermined maximum value $m_{max}$ are ignored in the averaging process (706, 709, 710, 711).

5. A method as claimed in claim 4, wherein only values of the rate of change of the temperature are employed that were determined after the variation of temperature with time had occurred that was smaller than the predeterminable minimum value $m_{min}$ or greater than the predetermined maximum value $m_{max}$ (709, 710).

6. A method as claimed in claim 4, wherein on the occurrence of a value of the rate of change of the temperature that is smaller than a predeterminable minimum value $m_{min}$ or greater than a predetermined maximum value $m_{max}$, continuing to heat the water for a set period of time $t_{koch}$ after the temperature $T_{HIGH}$ is reached.

7. A method as claimed in claim 6, wherein the water is cooled by switching off the heating device for a set period of time $t_{kühl}$, switching the heating device on directly if during cooling the rate of change of the temperature dT/dt is smaller than a predeterminable limit value $m_{grenz}$, switching the heating device on for heating the water to the temperature $T_{HIGH}$ if the water temperature is lower than $T_{HIGH}$, subsequently maintaining the heating device switched on for a period of time $t_{koch}$, and subsequently switching the heating device off again for the set period of time $t_{kühl}$ (804, 805).

8. A method as claimed in claim 6, and further including the step of controlling the heating device upon expiration of the set period of time $t_{kühl}$, such that the water temperature is maintained at the value it had after the set time period has elapsed (808).

9. A method as claimed in claim 1 or claim 2, and further including the step of cooling the water on reaching the boiling point (607, 802).

10. A method as claimed in claim 9, wherein the water is cooled by switching off the heating device for a set period of time $t_{kühl}$ (806, 807).

* * * * *